United States Patent [19]
Rosenbluth

[11] Patent Number: 5,553,270
[45] Date of Patent: Sep. 3, 1996

[54] APPARATUS FOR PROVIDING IMPROVED MEMORY ACCESS IN PAGE MODE ACCESS SYSTEMS WITH PIPELINED CACHE ACCESS AND MAIN MEMORY ADDRESS REPLAY

[75] Inventor: Mark B. Rosenbluth, Hudson, Mass.

[73] Assignee: Digital Equipment Corporation, Maynard, Mass.

[21] Appl. No.: 562,713

[22] Filed: Nov. 27, 1995

Related U.S. Application Data

[63] Continuation of Ser. No. 115,922, Sep. 1, 1993, abandoned.

[51] Int. Cl.$^6$ ................................................ G06F 12/02
[52] U.S. Cl. ........................................ 395/496; 395/284
[58] Field of Search ................................. 395/496, 284, 395/308, 445, 455

[56] References Cited

U.S. PATENT DOCUMENTS

| | | | |
|---|---|---|---|
| 3,693,165 | 9/1972 | Reiley et al. | 395/417 |
| 4,847,758 | 7/1989 | Olson et al. | 250/201.5 |
| 4,858,111 | 8/1989 | Steps | 395/470 |
| 4,912,626 | 3/1990 | Fiacconi | 395/481 |
| 4,942,521 | 7/1990 | Hanawa et al. | 395/455 |
| 4,953,079 | 8/1990 | Ward et al. | 395/464 |
| 4,991,081 | 2/1991 | Bosshart | 395/403 |
| 5,014,195 | 5/1991 | Farrell et al. | 395/455 |
| 5,034,885 | 7/1991 | Matoba et al. | 395/470 |
| 5,125,085 | 6/1992 | Phillips | 395/449 |
| 5,148,536 | 9/1992 | Witek et al. | 395/467 |
| 5,210,845 | 5/1993 | Crawford et al. | 395/455 |
| 5,253,358 | 10/1993 | Thoma, III et al. | 395/500 |
| 5,280,597 | 1/1994 | Takata et al. | 395/496 |
| 5,317,720 | 5/1994 | Stamm et al. | 395/470 |
| 5,333,296 | 7/1994 | Bouchard et al. | 395/497.02 |

OTHER PUBLICATIONS

Benjamin Maytal, "Design Considerations for a General-Purpose Microprossessor", Proc. 22nd Hawaii Int'Conf. on Systems Sciences, Jan. '89, pp. 72–74.

*Primary Examiner*—Tod R. Swann
*Assistant Examiner*—David J. O'Neill
*Attorney, Agent, or Firm*—Lindsay G. McGuinness; Denis G. Maloney; Arthur W. Fisher

[57] ABSTRACT

A computer system includes a processor having a primary cache, and a secondary cache data store, cache tag store, and memory controlled by a memory controller. The cache tag store, secondary cache data store, and memory share a common address bus. The secondary cache data store and the memory share a common data bus. In addition, some of the bits of the address bus are saved and fed directly to the memory. The memory controller provides for pipelined secondary cache accesses, during which a corresponding tag from the cache tag store is compared in the processor against the required memory address to determine if the data is located in the secondary cache. If the data is not in the secondary cache, the memory controller asserts the appropriate signals to obtain the data from memory. Because some of the address bits are fed directly to the memory, the setup time for memory control signals can be satisfied during the comparison of the cache data tag. In addition, while the memory reference is being performed, the original version of the address bits may be updated to perform page mode addressing of the secondary cache.

5 Claims, 5 Drawing Sheets

APPARATUS FOR PROVIDING IMPROVED MEMORY ACCESS IN PAGE MODE ACCESS SYSTEMS WITH PIPELINED CACHE ACCESS AND MAIN MEMORY ADDRESS REPLAY

This application is a continuation of application Ser. No. 08/115,922, filed Sep. 1, 1993, abandoned.

BACKGROUND OF THE INVENTION

The invention relates to computer systems in general and, more specifically, to a method and apparatus for caching data in a computer system.

As it is known in the art, a computer system generally includes a Central Processing Unit (CPU) for processing instructions, as well as a main memory device which is used to store data processed by the instructions. Due to the latency inherent in obtaining data from the memory devices, often a RAM device which is smaller and faster than main memory, called a Cache RAM, is provided between the CPU and the memory device.

The Cache RAM is used to store subsets, or blocks, of data from memory that may be used quickly and efficiently by the Central Processing Unit for processing the instruction sets, without incurring the time delay associated with accessing main memory.

Generally, the Cache RAM is external to the Central Processing Unit. However, as technology has advanced and integrated circuit devices are able to include more logic, a Cache RAM has been provided within the CPU integrated circuit device. Thus, access time for obtaining data from a RAM device is further reduced, because the time delay associated with accessing a RAM device outside of the integrated circuit is eliminated. The RAM device which is included in the integrated circuit is generally referred to as a primary cache.

However, although having a primary cache on the integrated circuit greatly reduces the latency for receiving data in the cache, because the cache is located on the integrated circuit it is a fixed size. Thus, when the CPU needs data that is not in the cache, it must access a memory device external to the integrated circuit device. One approach is to provide a separate cache which is larger than the primary cache yet smaller and faster than main memory in the system design. This separate cache is generally referred to as a secondary cache.

One problem associated with including a secondary cache is that generally the main memory, the secondary cache and the primary cache all need a separate memory controller. In addition, an arbitration device is required between the three controllers to ensure that the data in each remains coherent. This arbitration is often complex and prone to design error.

A second drawback of including both a secondary cache and main memory is due to the width of the data busses which couples the integrated circuit to the secondary cache and main memory.

Due to the desire for improved performance of computer systems, a 64 bit architecture has been implemented in the CPU designs. By providing a wider data bus, the CPUs are able to receive twice the amount of data per memory access (as opposed to that received on a 32 bit bus) and thus can process data faster and more efficiently. As a result of using the 64 bit architecture, however, the busses connecting the secondary cache to the integrated circuit and the main memory to the integrated circuit each include 64 bits of data as well as parity bits and separate address busses. Thus, the amount of pins used in accessing external memory devices alone uses a large portion of the available pins of the integrated circuit device. Because there are I/O devices, ROMs, and other devices which also require interface pins of the CPU integrated circuit, design tradeoffs must often be made between improving system performance by including a secondary cache or increasing the package size (and consequently the cost and area) of the CPU device to increase the number of available I/O pins.

SUMMARY OF THE INVENTION

In accordance with the present invention, an apparatus for controlling memory includes a processor for processing an instruction set including a first small fast memory, a first address bus coupled to the processor, a data bus coupled to the processor, a second memory, larger and slower than the first small fast memory, coupled to the first address bus and the data bus for storing data to be used by the processor, and a third memory, larger and slower than the second memory, coupled to the first address bus and the data bus, with the second memory including a plurality of addressable locations each for temporarily storing data from the third memory. In addition, the apparatus further includes a tag store, coupled to the first address bus and to the processor, having a plurality of entries corresponding to respective locations of the second memory, for storing a tag address portion indicating the address of the third memory in which the data in the corresponding location of the second memory is stored, and memory controller for controlling accesses to the first, second and third memories. The memory controller further includes means for determining whether data required by the processor is stored in the second memory, and means for providing data to the processor on the data bus from either the second memory or the third memory. With such an arrangement, setup time constraints for the third memory may be satisfied while the tag address portion is compared to an address required by the instruction to determine if the requested data is in the second memory. Thus, a technique is provided for allowing a second and third memory to share a common address and data bus to minimize latency involved with accessing the third memory when required data is not located in the second memory.

BRIEF DESCRIPTION OF THE DRAWINGS

The above-mentioned and other features of the invention will now become more apparent by reference to the following description taken in connection with the accompanying drawings in which.

DESCRIPTION OF THE PREFERRED EMBODIMENT

Figure 1:
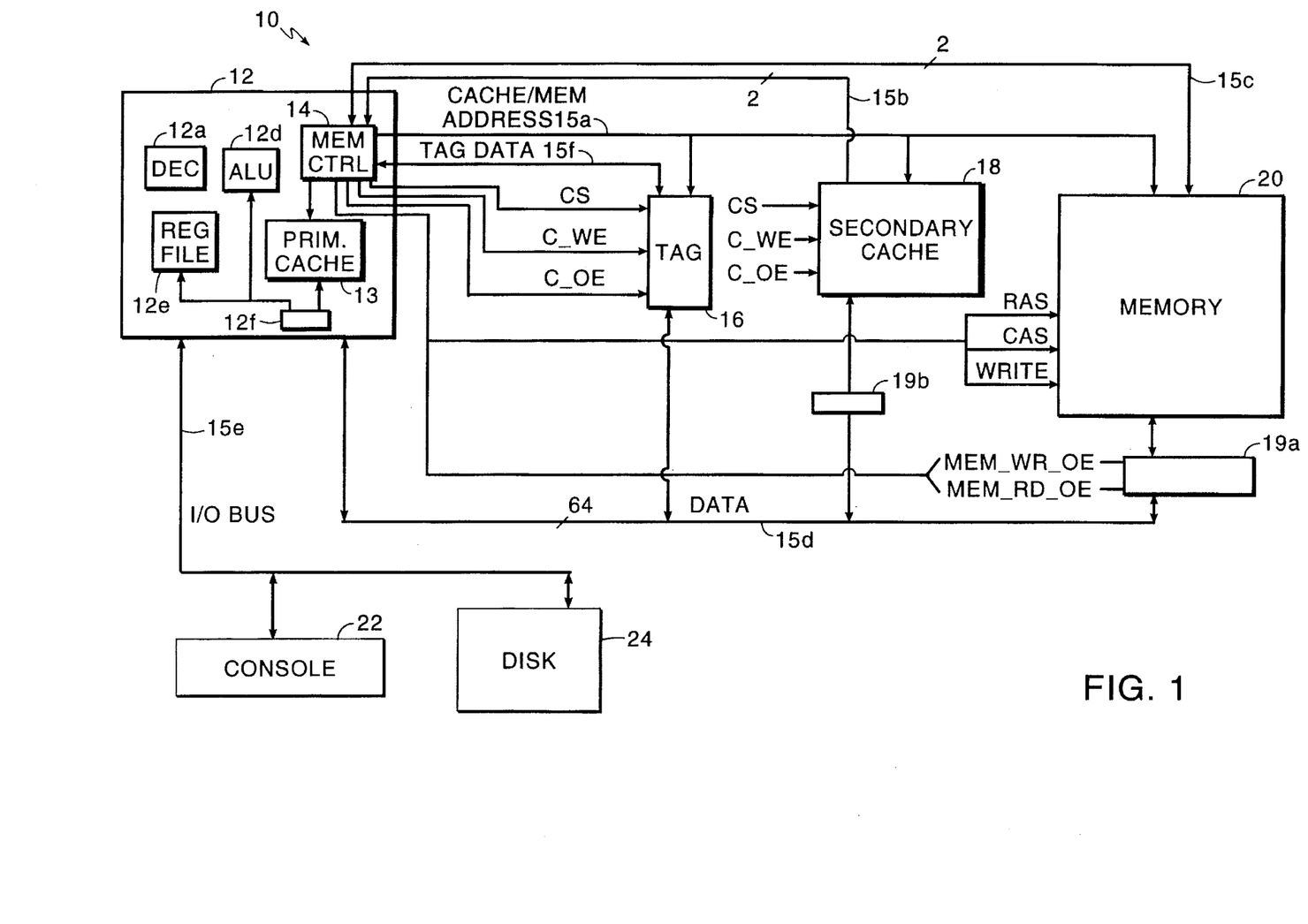
FIG. 1 is an illustration of a computer system including a memory subsystem embodying the present invention.

Referring now to FIG. 1, a computer system 10 is shown to include a Central Processor Unit (CPU) 12 for processing an instruction stream. The CPU 12 is shown to include a decoder (DEC) 12a, which is used to decode the instructions of the instruction stream.

The CPU 12 also here includes a register file 12e for storing operands and data for each instruction, and an Arithmetic Logic Unit (ALU) 12d for performing various arithmetic functions on data stored in the register file 12c. In addition, the contents of register file 12c and data from the ALU 12d may be used as an address to a primary cache 13. The primary cache 13 is a fast memory device which is used for storing instructions or data from a secondary cache 18 or a main memory 20. A memory controller 14 is used to control the data which is provided to the primary cache from the main memory 20 and a secondary cache 18 by providing read, write, and various control signals to the devices.

An I/O bus 15e couples the CPU 12 to various input/output devices such as a console 22, or a disk device 24.

In addition, the CPU 12 is coupled via address Busses 15a, 15b, and hi-directional Data Bus 15d to a Cache tag RAM 16, as well as secondary cache 18. Address busses 15a, 15c and data bus a 15d similarly couple the CPU 12 to a main memory device 20. The secondary cache 18 and the main memory device 20 are coupled via transceivers 19a and 19b to both send and receive data along data path 15d to the CPU 12.

Memory controller 14 is used to provide the memory control signals to the secondary cache 18, Cache Tag RAMs 16, and the main memory device 20. By providing control signals for both the secondary cache and main memory devices in the event that the primary cache requires data, the arbitration between the external units is centralized in one device, the memory controller 14. Therefore maintaining coherency between the two external memory devices is simplified by allowing only one centralized controller to provide commands to the appropriate memory devices as required.

Secondary cache data RAM 18 is a direct mapped cache which uses the Cache tag RAM 16 to store a corresponding 'tag' for each entry in the cache data Ram 18. Here a 'tag' is the upper physical address bits of the location in memory 20 from which the data stored at the cache location was obtained.

For example, given a 64 Kbyte cache with a data word width of 64 bits, there are 8K rows of 8 bytes of data. Thus, to address the cache, a 13 bit index address is used. This address corresponds to bits <15:3> of the physical address of memory. For each external memory reference, a probe of the secondary cache tag and data store is performed. During the probe, both the cache tag RAM 16 and the secondary cache 18 are accessed simultaneously using the 13 bit index address. Concurrently, memory device 20 receives the address on address bus 15a. The secondary cache 18 provides the data, while the cache tag RAM 16 provides memory physical address bits <28:16>, to CPU 12 to indicate where the data word provided by the secondary cache 18 is found in memory 20.

The tag which is provided by the cache tag RAMs 16 on line 15f is compared by memory controller 14 with the address provided by the CPU 12 to determine if the data at that location is the correct data needed for the instruction.

If there is a match between the address provided by the cache tag RAMs 16 and that provided by the CPU 12, then there is a 'hit' in the secondary cache, and the data which is provided during the secondary cache probe is written to the primary cache for subsequent use by the CPU 12.

If there is a mismatch between the physical address provided by the cache tag RAMs 16, and the physical address provided by the CPU 12, then a 'miss' occurs, and the data needed for the instruction is obtained from memory 20.

Figure 2:
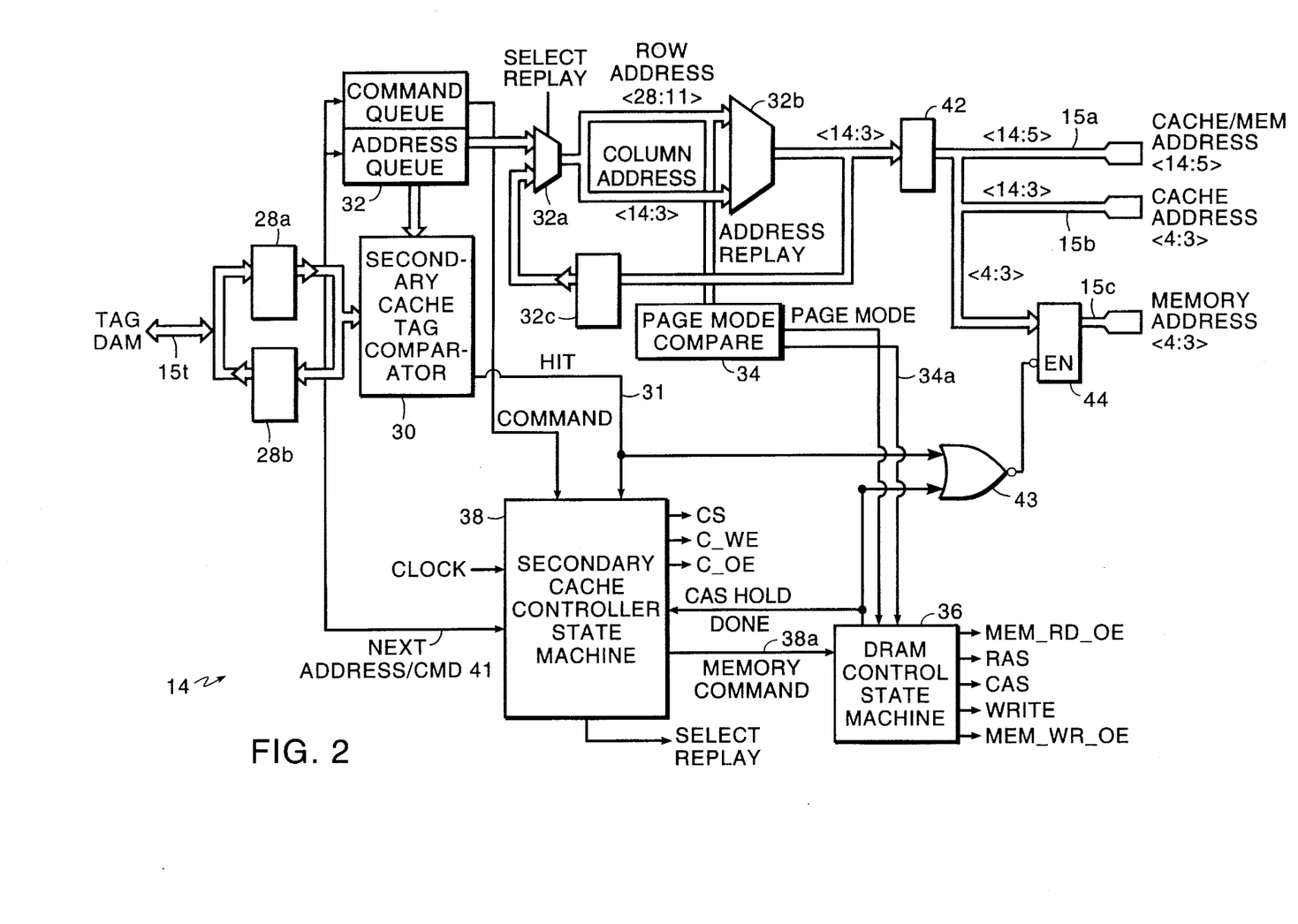
FIG. 2 is a block diagram illustrating a memory controller for use in the computer system of FIG. 1.

Referring now to FIG. 2, the memory controller 14 generally operates as follows. In address and command for each memory operation is respectively stored in an address command queue 32. The stored memory operations are a result of the series of instructions executed by the CPU 12 (FIG. 1) with the address generally provided from the register file 12c (FIG. 1) or the ALU 12d (FIG. 1).

Each address is fed from address queue 32 through mux 32a, and divided into a row address and a column address portion. Due to the characteristics of dynamic RAM devices used in memory 20, generally the method of addressing is to place the row address on bus 15a, assert the Row Address Strobe (RAS) signal, place the column address on bus 15a, and assert the Column Address Strobe (CAS) signal.

However, once the row has been addressed, data from consecutive operations in the same row may be provided by simply providing the next column address and asserting the CAS signal. Addressing of consecutive memory references in the same row of data is 'page mode' addressing. A page mode comparator 34 is provided to compare the row addresses of consecutive memory references to determine if a new row address must be provided for the reference. The page mode comparator 34 provides a page mode signal on line 34a to a Dynamic RAM (DRAM) control state machine 36.

The DRAM control state machine 36 here operates as a slave to a secondary cache controller state machine 38. The DRAM control state machine generally includes programmable counters which include registers, which may be updated by the user, for determining the number of computer cycles that the row address is stable before RAS is asserted, the number of computer cycles that RAS is to remain asserted, the number of cycles between memory refreshes, and similar data. The DRAM control state machine uses the page mode signal on line 34a and a memory command signal from secondary cache control state machine 38 to provide the appropriate signals to memory device 20.

A secondary cache control state machine 38 is used to provide the chip select signal (CS), the secondary cache write enable signal (C_WE) and the secondary cache output enable signal (C_OE) to the secondary cache 18 and the secondary cache TAG RAMs 16. The secondary cache control state machine 38 includes programmable counters which provide the number of cycles that the output enable, write enable, and chip select signals are asserted to perform read or write transactions.

In addition, the secondary cache control state machine 38 maintains control of the interaction of the address and command queue 32 and the DRAM control state machine 36 to maintain coherence between the main memory 20 and the secondary cache 18 as follows.

As mentioned previously, during a probe of the secondary cache, address bits <15:3> of bus 15a are provided to the secondary cache TAG RAMs 16, secondary cache data RAMs 18, and memory 20 simultaneously. The Tag rams 16 provide a TAG, (the upper address bits of the memory request) which is latched in tri-state latch 28a, and provided to the secondary cache tag comparator 30. As part of the probe, the tag comparator 30 compares the data received from latch 28a against the upper address bits of the memory request provided from address queue 32. The HIT status is provided to secondary cache control state machine 38 on line 31.

In the event of a HIT, correct data has already been received during the probe of the cache tags 16 and secondary cache data RAMS 18, and the secondary cache control state machine 38 asserts the Next Address\Command signal on line 41 to the address and command queue 32 to receive the next memory address and command.

In the event of a miss (or the absence of a HIT signal in a predetermined cycle), the secondary cache control state machine 38 asserts the Select Replay signal on line 42 to the mux 32a for providing a replay address, stored in latch 32c. In addition, a memory command is provided on line 38a to the DRAM control state machine 36. Once the command for memory 20 has been initiated, the secondary cache control state machine 38 waits for the CAS HOLD DONE signal from the memory control state machine 36 before asserting the Next Address\Command signal on line 41 to the address and command queue 32. The CAS HOLD DONE signal indicates that the Column Address Strobe (CAS) hold time has elapsed in the case of a miss in the cache.

Generally, because instructions typically access memory data in order, and due to the delay with obtaining data from an external memory device, (secondary cache or main memory), each memory transaction requests a block of data. A block of data is generally a group of longwords stored in consecutive memory addresses. The CPU 12 initiates a command, for example 'Block Fill', which indicates that a block of data is required from external memory, where the first quadword is at an address provided in the 'FILL' instruction, and other required data are located at consecutive longword displacements from the original address. The block of data is provided to the primary cache of the CPU 12.

Because block addressing uses sequential addresses, the address bits which differ for each memory access are only the address bits which correspond to the bits associated with the block index. For example, with a block size of 4 quadwords, only bits 4 and 3 change value during the block access. Such an arrangement is shown below in Table 1, using a 15 bit address.

| Address: | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| QW0 | 1 | 1 | 1 | 1 | 1 | 1 | 1 | 1 | 1 | 1 | 1 | 0 | 0 | X | X | X |
| QW1 | 1 | 1 | 1 | 1 | 1 | 1 | 1 | 1 | 1 | 1 | 1 | 0 | 1 | X | X | X |
| QW2 | 1 | 1 | 1 | 1 | 1 | 1 | 1 | 1 | 1 | 1 | 1 | 1 | 0 | X | X | X |
| QW3 | 1 | 1 | 1 | 1 | 1 | 1 | 1 | 1 | 1 | 1 | 1 | 1 | 1 | X | X | X |

Thus, only two bit of address, bits 4 and 3, are changed during a block access with a block size of four quadwords. Because it is a quadword access (8 bytes), the lower bits of the address <2:0> are not required to perform the memory access, and are generally decoded into a mask of 8 bits which is used for selecting the appropriate bytes inside the CPU 12.

If the block size is larger than 4 quadwords, generally the number of bits of the address which change during the block address is given by the function $\log_2 (N)$, where N is the number of quadwords in the block.

By replicating the bits of the address which correspond to the block index (in this example, bit 4 and 3) to provide a dedicated number of address bits for memory, the address provided to the memory device 20 remains stable while the cache address index is advanced for the next transaction.

Referring again to FIG. 2, a preferred embodiment of the memory controller 14 additionally includes a flow through latch 44 for storing the block index bits <4:3> of each address provided to memory. Address bits <15:3> for a cache and memory access are provided from mux 32b and stored in flip flop 42. The address is shown here to include 12 bits, however, the number of bits for each address will be a function of the size and layout of the cache and memory. The address stored in flip-flop 42 is provided to the cache and memory address pins on bus 15a. Here, the lower two bits, <4:3> on bus 15b are dedicated to providing the block index address bits <4:3> to the secondary cache 18 and cache tag RAM 16 of FIG. 1.

The lower bits <4:3> on bus 15b are further provided to a flow through latch 44. Latch 44 is 'slaved' to flip-flop 42, that is it is enabled to allow bits <4:3> from address bus 15b to flow through to bus 15c when either the HIT signal is asserted or a CAS HOLD DONE signal is asserted. Thus, this signal indicates that the data was obtained from memory, and the memory address may be changed to handle the next read or write request.

As shown in FIG. 2, NOR gate 43 is used to provide the enabling signal to the flow through latch 44. Although a NOR gate has been shown, another circuit providing a similar function may also be used.

Figure 3:
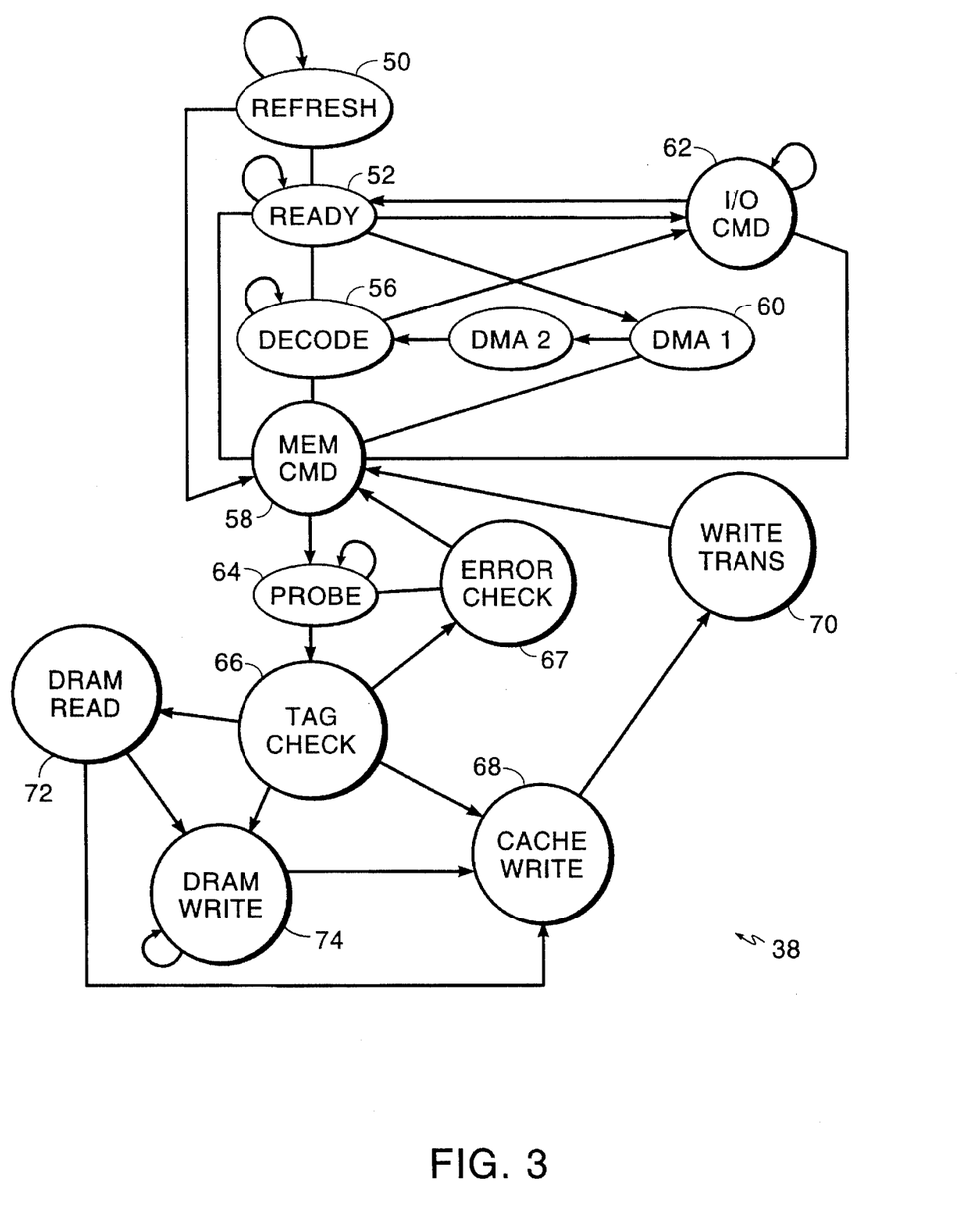
FIG. 3 is a flow diagram of a state machine included in the circuit of FIG. 2.

Referring now to FIG. 3, a state diagram of the secondary cache control state machine 38 is shown to include a refresh state 50. The refresh state is entered when it is necessary to perform a refresh of the DRAMs in main memory 20. Generally, the refresh control includes a refresh count register and a refresh counter. The refresh count register is loaded by the user, and indicates the number of clock cycles between refreshes. This value is dependant upon the cycle time of the CPU and the characteristics of the DRAM.

Once the DRAMs have been refreshed, the secondary cache control state machine 38 enters a ready state 52, where it waits for commands from address and command queue 32 (FIG. 2). The types of commands include Direct Memory Access (DMA) commands, I/O commands, or memory commands. Once a command is received, the state machine 38 transitions to a decode state 56, which transitions to either a Memory command state 58 (for memory commands), a DMA1 state 60 (for DMA commands), or an I/O state 62 for I/O commands.

In memory command state 58, control signals are provided to the secondary cache 18 and tags 16 by memory controller 14 to enable the state machine to transition to the probe state 64. During the probe, as described previously, the cache tag RAMs 16 (FIG. 1) and the secondary cache data RAMs 18 (FIG. 1) are accessed by asserting the chip select signal (C_CS) and the output enable signal (C_OR). The data and tag are transmitted by secondary cache 18 and tags 16 and received and stored in CPU 12. Once the data has been received by the CPU 12, the state machine transitions to Tag check state 66. During Tag check state, the tag received from tag RAM 16 (FIG. 1) is compared against the upper address bits of the address provided by address and command queue 32. If there is a match between the address bits and the provided tag (a HIT), and if the command is a read command, then it is determined that correct data was received during the probe, and the state machine transitions to error check state 67. During error check state 67, the parity of the received data is verified, and the state machine transitions back to memory command state 58 to receive the next memory command.

If there is a match between the upper address bits provided by address and command queue 32 and the provided tag, and the command is a write command, the state machine transitions to the cache write state 68. During cache write state, the chip select signal (C_CS) and the write enable signal (C_WE) to the secondary cache are asserted, and data provided by the CPU 12 on data bus 15*d* is written to the cache data RAMs. After assertion of the control signals, the state machine transitions to the write transaction state 70, during which the signals remain asserted for the required time period to perform the cache write operation. Once the write operation is complete, the state machine transitions back to the memory command state 58 to receive the next memory command.

Because the secondary cache here is a write-back cache, the data written to the secondary cache RAMs 18 is not written simultaneously to memory 20. Rather, a bit indicating that the data at the memory address has been modified is asserted. When the CPU 12 requires use of a location in secondary cache RAM 18 for a new memory address, the modified data at the required location is stored in memory 20 before the data from the new memory address is stored at the location of the secondary cache RAM 18.

If the upper address bits provided by address queue 32 and the provided tag do not match, the state machine proceeds to either the DRAM read state 72 (for read or read modify write operations) or to the DRAM write state 74. During these states, the secondary cache control state machine 38 provides the appropriate memory command on line 38*a* to the DRAM control state machine 36, which performs the operation, and upon completion returns control to the secondary cache control state machine 38, through the use of the signal CAS_HOLD_DONE. If there is a read modify write operation with a cacheable address and a masked write, the state machine transitions from DRAM read state 72 to cache write state 68, to write transaction state 70 then to memory command state 58 to receive the next memory command. Since the system described here is a write-back cache, the modified data written to the secondary cache RAMs 18 is later written back to the memory device 20 when space is needed in the cache RAMs 18 by the CPU 12.

For either a read or a write command, the state machine transitions to cache write state 68 in order to update the secondary cache data RAMs 18 and cache tag RAMs 16 with the correct data from main memory 20 for the given memory address provided on address bus 15*a*. The cache write state 68 then updates the secondary cache as described previously.

Figure 4:
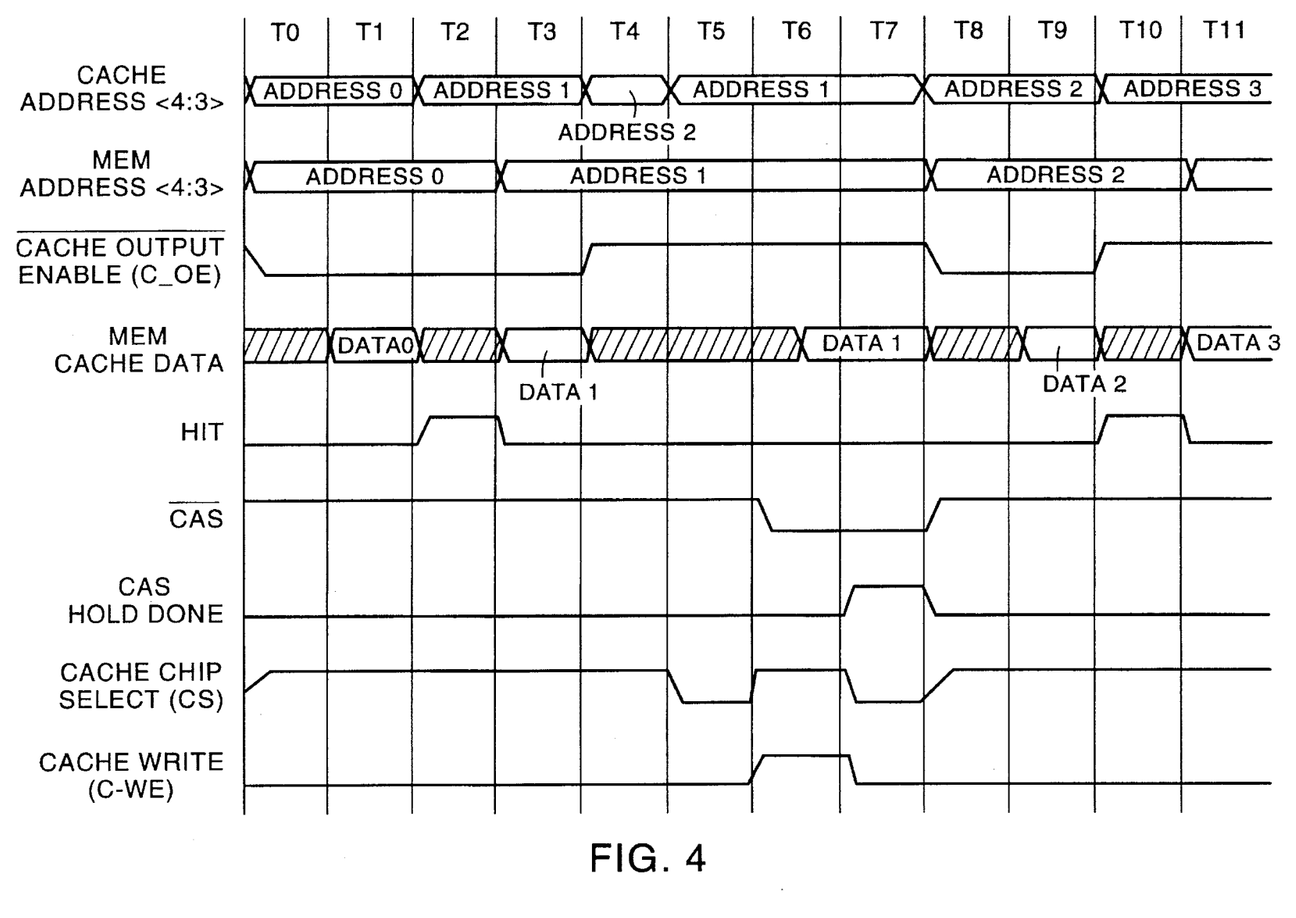
FIG. 4 is a timing diagram illustrating the use of the memory controller of FIG. 2 in the computer system of FIG. 1.

Referring now to FIG. 4, a timing diagram illustrating the use of the memory controller 14 of FIG. 2 is described with reference to FIG. 2. For illustration purposes, only the values of the lower two bits of the cache address bus 15*b* and the memory address bus 15*c* are shown, because, as described previously, during a sequential block access the other bits do not change for each memory access of the block.

At time T0, the address bits for accessing Quadword 0 are provided on Cache bus 15*b* and memory bus 5*c* (FIG. 2). A setup time characteristic is required to be satisfied for accessing both the Cache tag RAMs 16 and the secondary Cache Data RAMs 18. The setup time characteristic is the amount of time that the address on address bus 15*a* and 15*b* must be stable before data from the cache tag RAMs 16 and the cache data RAMs 18 is latched. At time T1, the output enable, (here shown low-asserted) in asserted and the data is provided on data bus 15*d* of FIG. 1.

At time T2, secondary cache address bits <4:3> on bus 15*b* switch to enable access of Quadword 1, while memory address bits <4:3> on bus 15*c* remain stable. Also at T2, a 'HIT' signal is provided, indicating that the data is available in the cache. This 'HIT' signal enables the latch 44 of FIG. 2 to pass the lower address bits for accessing Quadword 1 from bus 15*b* to memory address bus 15*c*.

At time T3, the data for Quadword 1 is provided, and at time T4 the address on bus 15*b* switches to enable access of Quadword 2, while the address on bus 15*c* remains stable. Here, the absence of a HIT signal at time T4 indicates that there has been a 'miss' in the cache.

The secondary cache control state machine 38 uses this absence of the HIT signal to provide the address from replay latch 32*c* (FIG. 2) to flip-flop 42 and consequentially secondary cache address bus<4:3>. During this time period, memory address bus 15*c* remains stable, and thus the set-up time characteristic for addressing memory 20 begins to be satisfied during cycle T3, and continues to accrue even though the address to the secondary cache data RAMs 18 changes during cycles T4 and T5.

After the setup time for the memory address has been satisfied, at time T6, the CAS signal is asserted to memory 20, and the data is provided on data bus 15*d* during cycles T6 and T7. In the case of a read miss in the secondary cache RAMs 18, the secondary cache memory controller 38 writes the data from data bus 15*d* into the secondary cache RAMs as shown during T6 by asserting the C_WE signal, and in addition, the correct TAG is provided on bus 15*f*, and the secondary cache TAG RAMs 16 are also updated with the correct TAG.

Subsequently, at T9 the cache reference for Quadword 2 is completed. Thus, such an arrangement allows for closely piplined cache accesses with only a minimal delay due to memory accesses as a result of a miss in the cache. In addition, such an arrangement allows for minimal duplication of pins on the package of the processor 12.

Referring again to FIG. 2, certain modifications can be made to the preferred embodiment of the memory controller 14 in an effort to save logic gates in the design. These modifications, described below, incorporate the basic functions of the memory controller 14, although providing reduced performance for main memory accesses relative to the preferred embodiment.

In one embodiment, the replay flip-flop 32*c*, and the multiplexer 32*a* are removed from the memory controller circuit 14. Due to the lack of replay flip-flop 32*c*, the address on address bus 15*a* and 15*b* must remain stable until a determination of the 'HIT' status is made. Because the address remains stable for this extended period, both the secondary cache data RAMs 18 and the memory 20 can be accessed using identical addresses. As a result, the latch 44, NOR gate 43, and pins for bus 15*c* are no longer necessary for memory controller 14, and the bits <4:3> of the address for main memory 20 are driven from the cache address bus 15*b*.

Consequently, this embodiment provides both a reduced pin count and a reduced gate count, although providing reduced performance for secondary cache accesses as compared to the preferred embodiment as described with reference to FIGS. 2, 3 and 4. However, such a design may be desirable in certain applications where there are fewer available gates and pins, and the delay associated with memory references is less critical.

Figure 5:
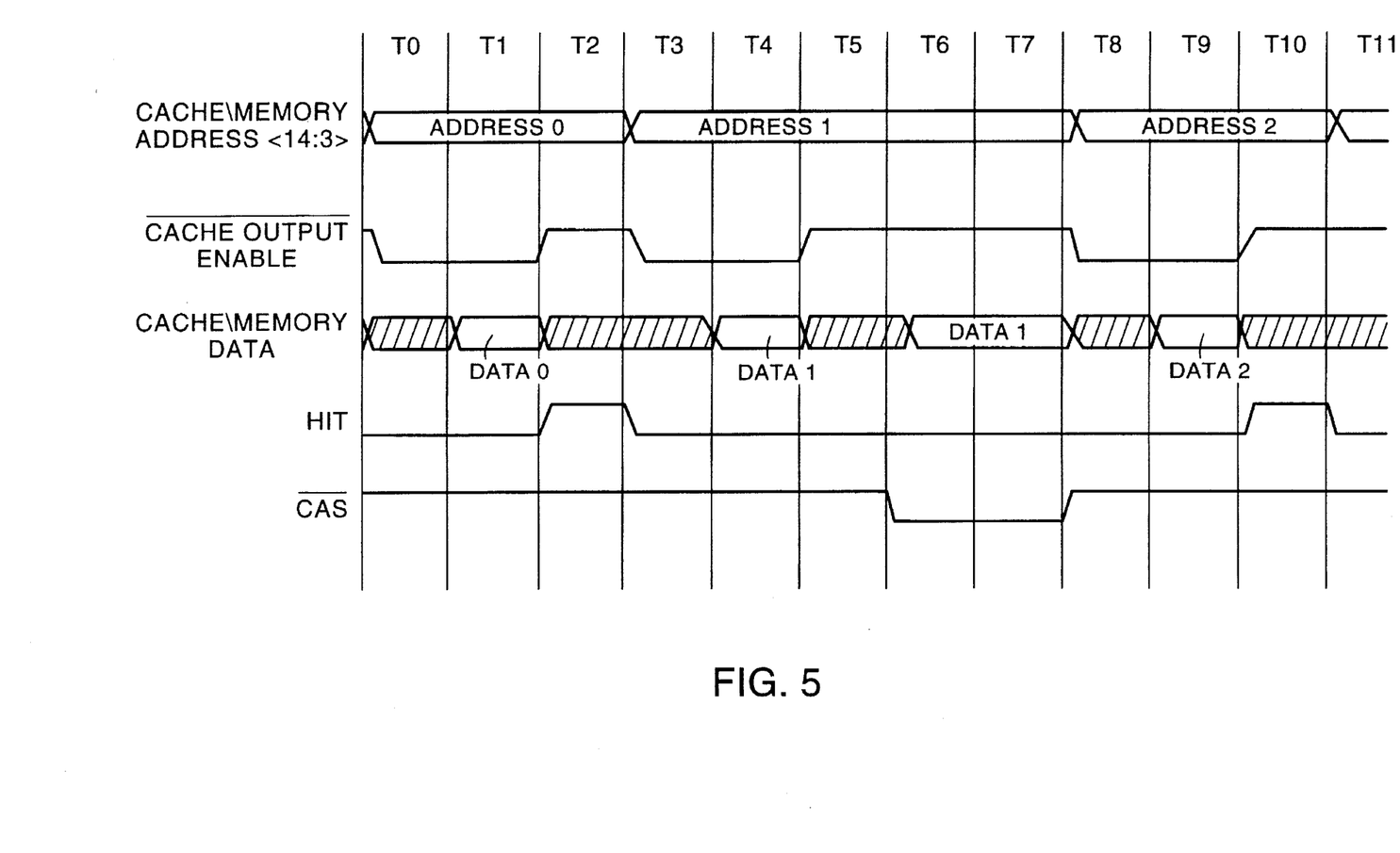
FIG. 5 is a timing diagram illustrating the operation of another embodiment of the circuit of FIG. 2 in the computer system of FIG. 1.

The effect of the operation of memory controller 14 due to the removal this logic is shown in FIG. 5. At T0, the address for the cache is transmitted on address bus 15a to the cache tag RAMs 16, the cache data RAMs 18, and the memory 20.

The data and tag are provided from cache data RAMs 18 and cache tag RAMs 16 on Bus 15d during clock cycles T3 and T4. At T1, the data and tag are latched in the CPU 12 and, during T1, a comparison is made against the data from cache tag RAMs 16 and the upper portion of the memory address provided by the CPU to determine if the address portions match. At time T2, if a match has occurred, the HIT signal is asserted, and the CPU is able to proceed with the next cache access. Thus, at time T3, the index address for the next Cache access appears on the address line 15a.

Starting at time T3, an example of a secondary cache 'miss' situation is shown. At time T3, the address is placed on address line 15a and at time T4, after setup time characteristics have been satisfied, the Output Enable signal is asserted. The data from cache data RAMs 18 and the tag from cache tag RAMs 16 are fed into the memory controller 14 and, at T4, the memory controller 14 compares the received tag against the upper portion of the memory address. It can be seen that at T5 there is no assertion of the HIT signal, indicating that the data obtained from the cache is not the desired data.

The memory controller 14 uses the absence of the HIT signal during this time interval to assert the control signals to start access of memory 20. If the memory is operating in page-mode, the column address has been asserted on the address line 15a for a sufficient time to satisfy the set-up time for the Column Strobe signal (CAS). Thus, when no HIT signal appears at time T5, at T6 the memory controller 14 asserts the CAS signal, and the memory access is started.

As described in the preferred embodiment, because the cache and the memory share a common address bus, the setup time constraints for the memory are satisfied while the tags are being compared to the address provided by an instruction to determine if there is a hit or a miss in the secondary cache. Thus, this above described embodiment provides a technique for allowing a memory and a secondary cache to share a common address and data bus to minimize memory latency during memory accesses following a miss in the secondary cache, while also minimizing the gate count and necessary pins of the memory controller 14.

Having described preferred embodiments of the invention, it will now become apparent to one of skill in the art that other embodiments incorporating its concepts may be used. It is felt, therefore, that these embodiment should not be limited to the disclosed embodiments, but rather should be limited only by the spirit and scope of the appended claims.

What I claim is:

1. An apparatus comprising:

a processor for processing an instruction set, said processor including a first small fast memory;

a first address bus coupled to said processor;

a data bus coupled to said processor;

a second memory, larger and slower than said first small fast memory, coupled to receive an address on said first address bus and to transmit and receive data on said data bus for storing data to be used by said processor;

a third memory, larger and slower than said second memory, coupled to said first address bus and said data bus, with said second memory including a plurality of addressable locations each for temporarily storing data from said third memory;

control means for controlling accesses to said second and third memories, said control means further comprising:

means for determining whether data required by said processor is stored in said second memory;

means for providing data to said processor on said data bus from either said second memory or said third memory; and a second address bus comprising at least one bit, coupled between said processor and said third memory, for providing a copy of a portion of said address on said first address bus to said third memory such that said third memory is addressed using address bits from both said first address bus and said second address bus.

2. The apparatus of claim 1, wherein said means for controlling further comprises:

means for changing an address on said first address bus before determining whether said required data is included in said second memory;

means for storing copy of said address used to access said second memory;

means, responsive to an indication that said required data is included in said second memory, for updating said copy of said portion of said address on said second address bus to correspond to said changed address on said first address bus; and means, responsive to an indication that said required data is not included in said second memory, for updating said dedicated portion of said changed address on said first address bus to correspond to said stored copy of said address used to access said second memory.

3. The apparatus of claim 2, wherein said means for updating further comprises:

a state device, coupled to receive said at least one bit from said first address bus and forward said at least one bit to said second address bus;

means, coupled to said state device, for precluding the forwarding of said at least one bit to said second address bus until said means for determining indicates that the required data is included in said second memory; and means for precluding the forwarding of said at least one bit to said second address bus until data is provided from said third memory.

4. The apparatus of claim 2, wherein said number of bits of said at least one bit of said second address bus is derived from a block size by the function $\log_2(N)$, where N is said block size.

5. The apparatus of claim 1 wherein said means for determining further comprises:

means for comparing said tag address portion from said tag store corresponding to said required data against the address provided by said instruction to determine if the required data is included in said second memory.

* * * * *